Aug. 17, 1926. 1,596,316
E. M. SINGLETON
AUTOMOBILE SEAT
Filed Dec. 29, 1925
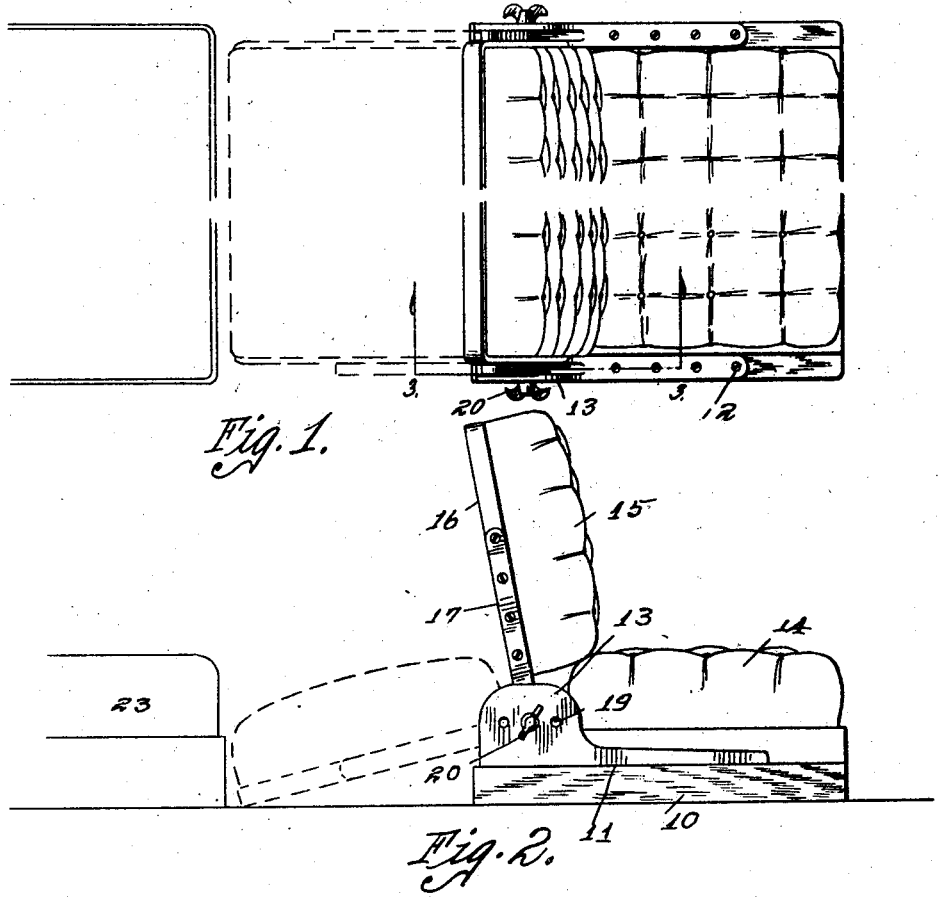
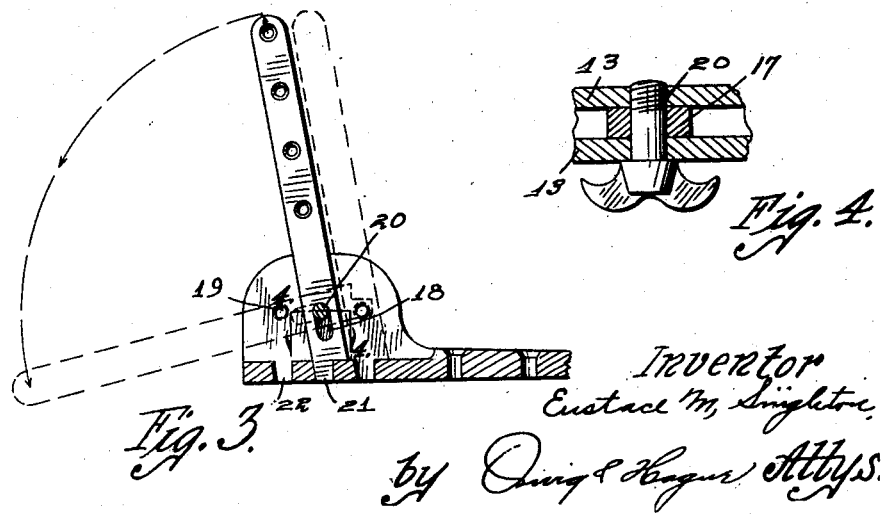
Inventor
Eustace M. Singleton
by Owing & Hague Attys.

Patented Aug. 17, 1926.

1,596,316

UNITED STATES PATENT OFFICE.

EUSTACE M. SINGLETON, OF MARSHALLTOWN, IOWA.

AUTOMOBILE SEAT.

Application filed December 29, 1925. Serial No. 78,157.

This invention relates to improvements in automobile seats.

The object of my invention is to provide an automobile seat of simple, durable and inexpensive construction, having a back which is adapted to be folded to a horizontal position and also adapted to be adjusted to various positions forwardly and rearwardly relative to the seat so that the distance between the back of the seat and the steering wheel may be varied to accommodate drivers of various sizes.

My invention consists in the construction, arrangement and combination of the various parts of the device, whereby the objects contemplated are attained, as hereinafter more fully set forth, pointed out in my claim, and illustrated in the accompanying drawings, in which:—

Figure 1 is a plan view of my improved seat.

Figure 2 is an end elevation; and

Figure 3 is a detail sectional view taken on the line 3—3 of Figure 1.

Fig. 4 is a detail sectional view taken on the line 4—4 of Fig. 3.

My improved seat comprises a base 10, each end of which is provided with an upwardly projected bracket 11 secured to the seat 10 by means of screws 12. The rear end of each of the brackets 11 is provided with a pair of spaced upwardly projecting flanges 13. Supported between the brackets 10 is a cushion 14 which serves as a bottom for the seat. The cushion 15 serves as a back which is mounted to a frame member 16. Each end of the said frame member is provided with a bar 17. The inner end of said bar 17 extends inwardly beyond the inner edge of the back 15, each of said inner ends having a slot 18, while the flanges 13 are provided with a series of openings 19 designed to receive a pivot pin 20 which extends through the slot 18. After the inner end of the bar 17 has been inserted between the flanges 13, as clearly shown in Figure 3, the inner end of each of said bars is provided with a contracted portion 21 designed to enter notches 22 in the bracket 10.

By this arrangement it will be seen that the seat back 15 may be adjusted forwardly or rearwardly by removing the bolts 20 and placing them in another set of openings 19, and at the same time the lower end 21 of the members 17 may be supported in another set of notches 22, so the seat may be adjusted to various forward and rearward positions of movement, as clearly illustrated in dotted lines, with the said back member at the same inclination relative to a vertical line when in any of said positions. If so desired, the back member may be elevated when in either of the said adjusted positions, causing the member 21 to disengage the notches 22, permitting the back to be moved to a substantially horizontal position, with the outer edge of the back adjacent to the forward edge of the back seat 23, thus providing means whereby the seat members 14 and 23 and the back member 15 may be utilized for a bed if so desired, or provide means whereby a hammock may be supported in the automobile above the said seat member.

Thus it will be seen that I have provided an automobile seat of simple, durable and inexpensive construction, and so constructed and arranged that the back member may be adjusted rearwardly and forwardly to accommodate operators of various sizes by simply removing the bolts 22, or the back member may be easily and quickly placed in a horizontal position if so desired.

I claim as my invention:—

A seat comprising a base, a bracket member secured to each end of said base, each of said bracket members being provided with an upwardly projecting flange and a horizontal row of notches, a seat member between said bracket members, a back member having at each end an inwardly projecting bar designed to rest adjacent to one face of one of the flanges of said brackets, each of said flanges being provided with an opening above each of the notches of said brackets and arranged in a row substantially parallel with said notches, the inner end of each of said bars being provided with a slot, and a bolt extending through said slot and into one of the openings of said flanges with the inner end of said bar resting in the notch below said opening, substantially as described and for the purposes stated.

Des Moines, Iowa, December 16, 1925.

EUSTACE M. SINGLETON.